United States Patent [19]

Dubreucq

[11] 4,165,850

[45] Aug. 28, 1979

[54] SAFETY DEVICE FOR A TRANSPORT SYSTEM

[75] Inventor: Jean-Claude Dubreucq, Paris, France

[73] Assignees: Regie Autonome des Transports Parisiens, Paris; Inter-Elec, Drancy, both of France

[21] Appl. No.: 764,710

[22] Filed: Feb. 1, 1977

[30] Foreign Application Priority Data

Feb. 4, 1976 [FR] France .............................. 76 03065

[51] Int. Cl.² .......................... B60L 15/00; B61L 3/22
[52] U.S. Cl. ................................ 246/182 B; 104/153; 246/63 C
[58] Field of Search ................................ 104/152, 153; 180/105 E; 246/63, 182 R, 182 B, 182 C, 187 R, 187 B; 324/161; 340/62, 263; 361/51, 239, 242; 364/426; 303/95-97, 92; 244/194; 318/584-585; 307/209, 219; 91/363 A

[56] References Cited

U.S. PATENT DOCUMENTS

| 3,070,185 | 12/1962 | Fales .......................... 180/105 E X |
| 3,521,174 | 7/1970 | Naubereit et al. ................. 324/161 X |
| 3,658,389 | 4/1972 | Okamoto et al. ................... 303/96 X |
| 3,679,894 | 7/1972 | Smith ............................... 246/182 C |
| 3,803,425 | 4/1974 | Carp .................................... 303/96 X |
| 3,808,427 | 4/1974 | Malon et al. ................. 246/182 C X |
| 3,825,744 | 7/1974 | Sibley et al. ...................... 246/182 C |
| 3,840,737 | 10/1974 | Hoyler ............................... 246/63 R |
| 4,017,044 | 4/1977 | Anderson et al. ........... 246/182 C X |

Primary Examiner—Stephen G. Kunin
Attorney, Agent, or Firm—Weiser, Stapler & Spivak

[57] ABSTRACT

A safety device for a transport system in which a vehicle travels on a track divided into sequential sections operates to stop the vehicle when a parameter representing the motion of the vehicle exceeds a threshold in the course of travelling over a track section. The device comprises two comparators each delivering during passage of the vehicle in each track section a comparison signal having a first value when the parameter remains within the threshold and a second value when the parameter exceeds the threshold. A coincidence detector is connected to receive the output signals of the two comparators and operates to initiate emergency braking of the vehicle if the output signals of the two comparators do not simultaneously have the same value during travel in a track section.

6 Claims, 4 Drawing Figures

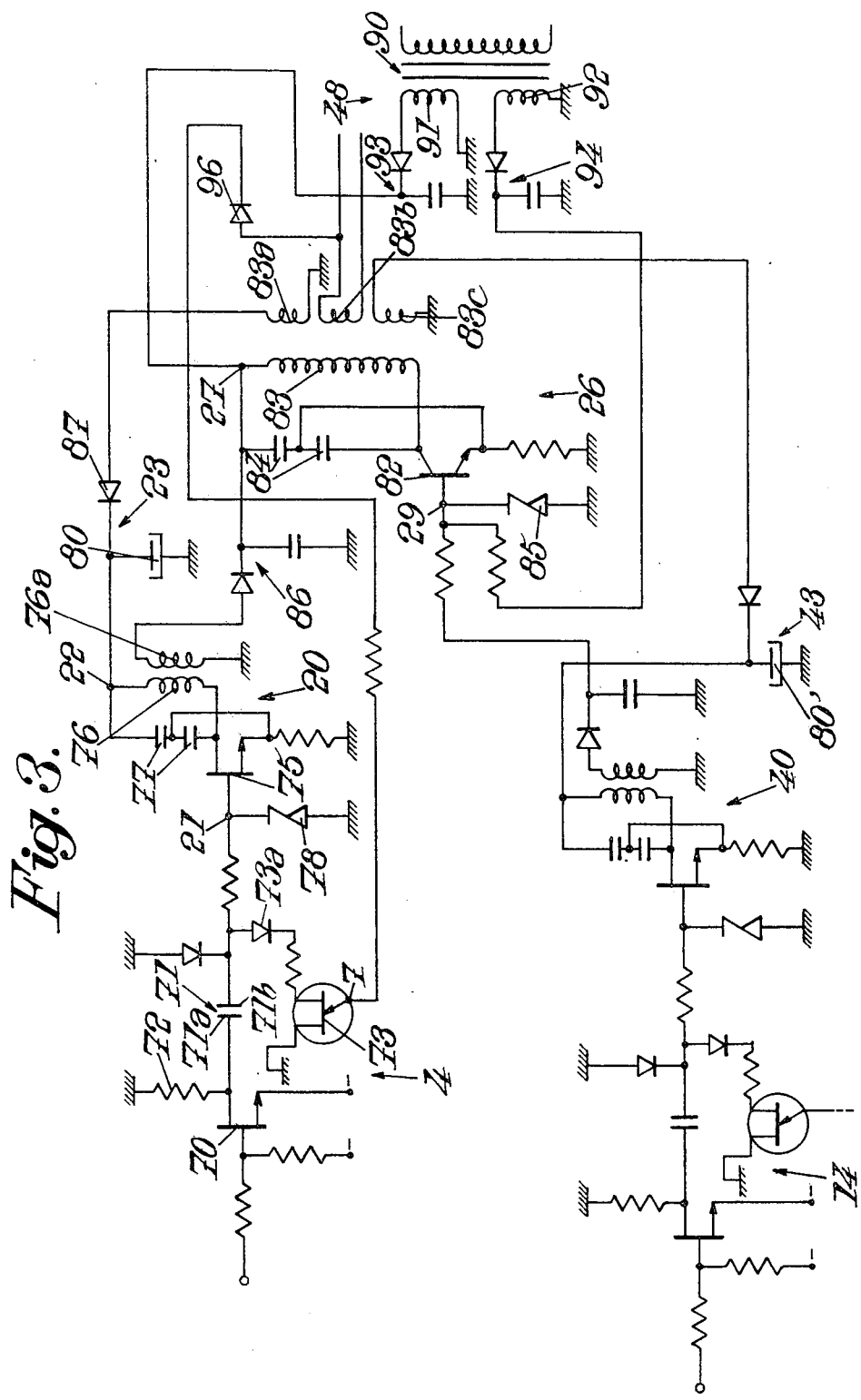

SAFETY DEVICE FOR A TRANSPORT SYSTEM

This invention relates to a safety device for a system or apparatus operating in a sequence of steps, the safety device being adapted to stop the system or apparatus when, at least during a step of the sequence, a parameter representing the aforementioned operation exceeds a set threshold in a given direction (i.e. is above or below it). The invention relates more particularly to a safety device for vehicles adapted to move over a track divided into sequential operating sections, in which case the representative parameter is the speed of the vehicle over each section or the time taken to travel along the section.

French Patent Specification No. 2,087,293 and the first certificate of addition thereto No. 2,198,658 describe a safety device of the aforementioned kind for vehicles adapted to move over a track divided into sections, the device comprising means which deliver, for each section, a comparison signal having a first value when the time taken by the vehicle to travel over the section is greater than a threshold (i.e. the speed over the section is below a threshold). The comparison signal has a second value, usually zero, when the travel time is below the threshold. The signal delivered by the comparison means is used by emergency braking means for completely stopping the vehicle. Generally, the signal is processed so that the presence of a signal does not affect the emergency braking means, but the disappearance of the signal, at least during a track section, causes emergency braking. In the devices described in the aforementioned patent and certificate of addition thereto, emergency braking is initiated only if the comparison signal disappears for a time at least equal to a given duration or over a length of the track greater than a given value. The object of the last feature is to avoid premature braking or stops.

The safety devices described in the aforementioned patent and first certificate of addition have given complete satisfaction. However, a certain number of precautions are necessary when constructing circuits for the aforementioned safety devices. The circuits must be "fail-safe" i.e. any fault or breakdown in the circuit must inevitably result in emergency braking and not simply in the failure of the safety device.

The main object of the invention herein is to simplify the construction of a safety device of the previously-mentioned kind, the entire device being "fail-safe".

Another object is to provide a safety device of the aforementioned kind in which at least some components are not specially designed to be fail-safe.

Another object of the invention is to still further reduce the probability of faults or breakdowns not detected by the safety device.

Another object is to reduce the number of faults or breakdowns which are not detected by the safety device.

SUMMARY OF THE INVENTION

According to the invention, there is provided a safety device for a system or apparatus which operates in a sequence of stages, the safety device acting to stop the system or apparatus when, at least during an operating stage, a parameter representing the said operation exceeds a set threshold in a given direction, the device comprising first and second comparison means each adapted to deliver, during each operating stage, a comparison signal having a first value when the parameter does not exceed the threshold during the stage and a second value when the parameter exceeds the threshold during the stage, which safety device comprises coincidence means comprising at least a first and a second input connected to the output of the first and second comparison means respectively and at least one output at which is delivered, during each stage, an output signal having a first level when the signals applied to the said inputs have the same value simultaneously and otherwise a second level an output signal having the second level, being used to stop the system or apparatus.

Accordingly, the safety of the system or apparatus is improved, since it is stopped if the two comparison means do not supply information in agreement, at least during a certain time in each operating step. In other words, at least some breakdowns of the safety device itself result in a stoppage of operation, i.e. in emergency braking in the case where the invention is applied to a vehicle moving along a track divided into sections.

In a preferred embodiment of the invention, safety is further improved by providing locking means which are arranged so that, during subsequent operating steps, the coincidence means delivers a signal at the second level when, during a step, the comparison signals transmitted by the first and the second comparison means, do not simultaneously have the same value. The locking means, therefore, can stop the system or apparatus, even if the stoppage has not been caused during the operating stage in which the output signal of the coincidence means had a second level. Advantageously the locking means comprise, for each comparison means, a store element and an AND gate element having two inputs, an input of each store element being connected to a respective output of the coincidence means, an output of each store element being connected to a first input of the corresponding AND gate element, the second input of the AND gate element being connected to the output of the associated comparison means. The store element delivers a signal having a first value when its input receives a signal having the first level, the output signal of the store element changing from the first to the second value when a comparison signal having the first value is applied to the second input of the corresponding AND-gate element.

Preferably, the first and second comparison means each comprise a pulse generator adapted to generate a pulse during each operating stage; the pulse has a first value when the operating parameter of the system or apparatus does not exceed the threshold value in the given direction during the operating stage; the pulse has the second value when the parameter exceeds the threshold value in the given direction during the stage. According to an advantageous feature, the safety device is arranged so that the pulse produced by the generator of the second comparison means appears at a given time $\theta$ after the pulse produced by the pulse generator of the first element, during a given operating stage and in normal operation. In that case, at least the first comparison means comprises delay means whose input is connected to the output of the corresponding pulse generator, so that the signals appearing at the outputs of the first and second comparison means appear substantially simultaneously for the same operating stage during normal operation. Thus, external perturbations which simultaneously affect the generator output signals do not prematurely stop the system or apparatus.

In order that the invention may be readily understood, an embodiment thereof will now be described, by way of example, with reference to the accompanying drawings, in which:

BRIEF DESCRIPTION OF DRAWINGS

FIG. 3 illustrates in more detail a part of the device shown in FIG. 1; and

DESCRIPTION OF PREFERRED EMBODIMENT

Figure 1:
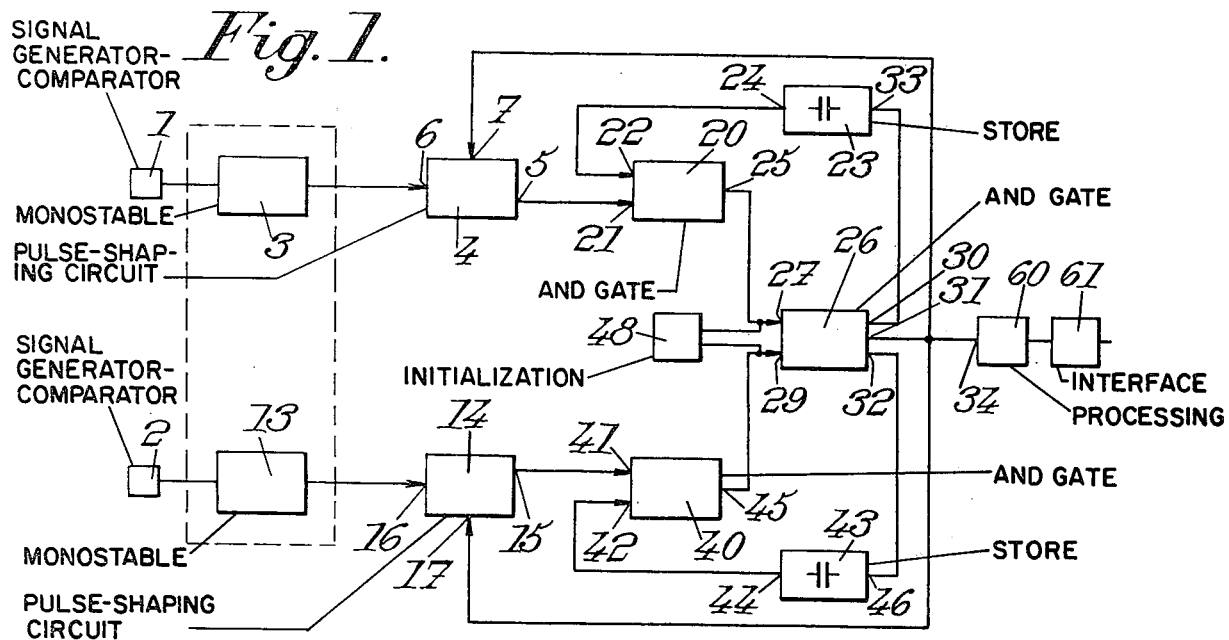
FIG. 1 is a block diagram of a safety device embodying the invention.

The safety device illustrated in the drawings is for a transport system of the kind described in the aforementioned French Patent Specification No. 2,087,293 and first certificate of addition No. 2,198,658. The transport system in question is a rail system, inter alia an underground system, in which the track of the vehicle (a train) is divided into sequential sections. In this transport system, the vehicles have automatic control means set so that the vehicle travels through each track section in a given time $t_o$. Each train comprises driving means and braking means, the braking means being actuated if the train travels over a section in a time shorter than $t_o$, and the driving means being actuated if the sections are covered in a time greater than the set time $t_o$. The safety device produces emergency braking when the train travels through at least one track section in a time not longer than $t'_o$, the duration $t'_o$ being less than $t_o$. In other words, the emergency brake is applied when the train speed exceeds a certain threshold value in a track section.

A known safety device of the aforementioned kind comprises a generator of signals varying in a given manner with time, usually saw-tooth signals having a given slope. The beginning of each saw-tooth corresponds to the beginning of a track section: to this end, means are provided to reset the saw-tooth produced by the generator to zero at the beginning of each section. The saw-tooth signals are applied to the first input of a comparator and a constant-value reference signal representing the duration $t'_o$ is applied to the second input of the comparator. In this manner, a signal or pulse is produced at the comparator output when the saw-tooth signal remains below a reference signal. The comparator output signal takes the value zero when the saw-tooth signal exceeds the reference signal. Normally, the occurrence of such a transition at the comparator output prevents the emergency brakes from being triggered. On the other hand, the absence of this transition over a track section (indicating that the train speed is excessive) is used for emergency braking. To this end, the comparator output signal is shaped (usually by a monostable) so as to be converted into a pulse having a set duration, substantially less than the duration to travel a section, after the last-mentioned transition has occurred.

In a safety device embodying the invention, as shown in FIG. 1, at least a second generator-comparator assembly is provided and likewise produces pulses of the previously-mentioned kind. In FIG. 1, the first and second assemblies are denoted by reference blocks 1 and 2 respectively.

However, as will be seen later with reference to FIG. 2, assemblies 1 and 2 are not identical in every respect. The two assemblies have different threshold values ($t'_o$), the difference being $\theta$. In the example, the reference signal applied to the second input of the comparator in assembly 1 corresponds to a duration $t'_o$, whereas the reference signal applied to the second input of the comparator in assembly 2 corresponds to a duration $t'_o + \theta$ more or less $\delta t$, i.e. to a duration $t'_o + \theta \pm \delta t$.

The output assembly 1 is applied to the input of a monostable 3 whose output is connected to the input of a shaping circuit 4. As will be seen in connection with FIG. 3, circuit 4 comprises a capacitor (not shown in FIG. 1) which becomes charged when monostable 3 supplies a pulse to input 6 of circuit 4. After the disappearance of the signal on input 6, the capacitor discharges, producing a signal at output 5 of circuit 4. Circuit 4 also has a zero-resetting input 7. The capacitor discharges when a signal is supplied to input 7.

The output of assembly 2 is applied to the input of a second monostable 13. The output of monostable 13 is connected to the input 16 of a pulse-shaping circuit 14 having an output 15 and a zero-resetting input 17. Circuit 14 is similar to circuit 4.

The output 5 of circuit 4 is connected to a first input 21 of a two-input AND gate 20. The second input 22 of the gate is connected to the output 24 of a store element 23 comprising a capacitor. In the example, the AND gate 20 comprises an oscillator whose output 25 supplies a periodic signal when d.c. signals are applied to inputs 21 and 22 simultaneously.

Output 25 of AND gate 20 is connected to a first input 27 of an AND gate 26 having two inputs 27 and 29. Like gate 20, gate 26 comprises an oscillator. It has three outputs 30, 31, 32 delivering identical periodic signals; the three outputs, however, are galvanically isolated from one another to prevent a breakdown or fault in a circuit connected to one output affecting the signals delivered by the other outputs. Output 30 is connected to input 33 of store element 23. Output 31 is connected to input 34 of a processing circuit 60 and also to zero resetting inputs 7 and 17 of circuits 4 and 14 respectively.

Output 15 of circuit 14 is connected to a first input 41 of an oscillator-type AND gate 40, having a second input 42 connected to output 44 of a store element 43. Output 45 of AND gate 40 is connected to input 29 of AND gate 26.

Input 46 of store element 43 is connected to output 32 of AND gate 26.

The output of circuit 60 is connected to the input of an interface circuit 61.

The input terminals 27, 29 of AND gate 26 are connected to two outputs of initialization means 48, such outputs being galvanically isolated but delivering similar signals.

The operation of the safety device shown in FIG. 1 will now be described with reference to the waveform diagrams in FIG. 2. The diagrams correspond to normal operation of the safety device, i.e. to operation without any fault in the circuits of the safety device itself. Various possible faults will be considered later.

Figure 2:
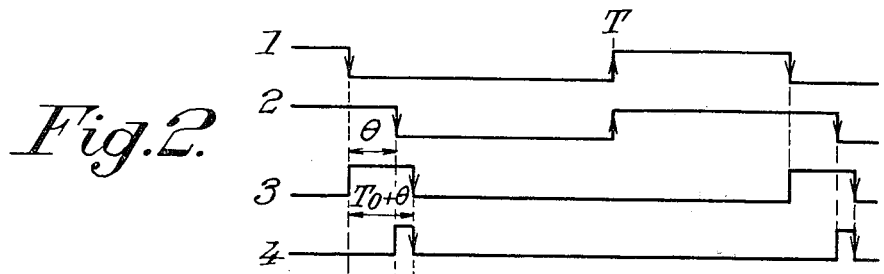
FIG. 2 is a set of waveform diagrams illustrating the operation of the device of FIG. 1.

In FIG. 2, the abscissas correspond to time whereas the ordinates correspond to the values of the various signals illustrated.

Waveform 1 in FIG. 2 represents the output signal of assembly 1 and waveform 2 represents the output signal of assembly 2. As already stated, during normal operation the signals show transitions from a "high" level to a "low" level, separated by a duration $\theta$, to within $\delta t$, for a single section. The output signals of blocks 1 and 2 return to the "high" level simultaneously at the beginning of each section (at the time T in FIG. 2).

Waveform 3 shows the output signal of monostable 3, and waveform 4 shows the output signal of monostable 13. These monostables are triggered by the falling edge of signals applied to their inputs. The duration of the signal supplied by monostable 3 has the value $T_o+\theta$ whereas the duration of the signal supplied by monostable 13 has the value $T_o$. During normal operation, therefore, the falling edges of the signals appearing at the outputs of monostables 3 and 13 are practically simultaneous for each section (to within $\delta t$).

At this point it should be noted that the fact that the assemblies 1 and 2 produce desynchronized signals which are resynchronized by monostables 3 and 13 means that the safety device does not have to take account of spurious signals occurring in both signal channels, i.e. at both assemblies simultaneously. In the absence of this feature, spurious signals could produce a signal incorrectly indicating proper operation and preventing the triggering of emergency braking. More generally, the signals from assemblies 1 and 2 are decorrelated and then re-correlated so as to check the correlation of the input signals.

The output signals of circuits 3 and 13 charge the capacitors of circuits 4 and 14 and the disappearance of such output signals results in a change of level and the discharge of the capacitors. In the described embodiment (as will be seen hereinafter with reference to FIG. 3), the capacitor in circuit 4 (or 14) is charged with negative polarity. When the output signal of the corresponding monostable 3 or 13 returns to zero, the charge on the capacitor changes level. These features are illustrated by waveform 5, which represents the signal appearing at output 5 of circuit 4.

Waveform 6 in FIG. 2 shows the signal appearing at output 24 of store element 23. An already stated, element 23 comprises a capacitor which is charged during normal operation. In other words, element 23 normally delivers a signal 50 (waveform 6) having a positive level greater than a set value. The capacitor of store element 23 discharges through the circuit of AND gate 20 when input 21 of gate 20 is supplied with a signal exceeding a set-value threshold 51 (waveform 5). In that event, a periodic signal appears at output 25 of gate 20 for a time $\tau$ (line 7, FIG. 2). Circuit 14 operates in similar manner to circuit 4, and store element 43 is similar to element 23.

The operation of AND gate 40 is identical to that of AND gate 20, and therefore diagrams showing the signals appearing at the outputs of the last-mentioned circuits are not given. During normal operation, however, the periodic output signal of gate 40 appears at the same time as the signal produced at output 25 of gate 20, and has substantially the same duration $\tau$. Under these conditions, i.e. when signals appear simultaneously at outputs 25 and 45 of gates 20 and 40, outputs 30, 31, 32 of gate 26 each deliver a periodic signal. Note that the output signals of gates 20, 40 can appear with a tolerance in time equal to the duration $\tau$.

The signal appearing at output 31 is applied to input 34 of a processing circuit 60 which, via an interface circuit 61, delivers a continuous signal representing a safety level. The permanent continuous signal is used for permanently closing solenoid valves (not shown) preventing the triggering of the emergency brakes. The absence of a signal at input 34 causes the continuous permanent signal to disappear and thus opens the solenoid valves and triggers emergency braking.

The signal appearing at output 31 is also used to discharge the capacitors of circuits 4 and 14.

The signal appearing at output 30 of gate 26 is for charging the capacitor of store element 23. Similarly, the signal supplied at output 32 is for charging the capacitor of the store element 43. Thus, as will be seen hereinafter, signals cannot appear at the outputs of gate 26 during a subsequent section unless a signal appeared at the outputs of gate 26 during the preceding sequence or unless no signals were produced by assembly 1 or assembly 2 (or both) during the same previous section. Such a signal is used for discharging the capacitor of the corresponding store element (23 or 24). In other words, during each section the output signal of each element 23 or 43 is dependent on the signals which have been produced (by assemblies 1 and 2) during the preceding section. These elements, therefore, serve to store earlier states.

To enable the train to travel the first section, it is necessary to charge the capacitors of elements 23 and 43 and, if necessary, to discharge the capacitors of circuits 4 and 14. Accordingly, circuit 48 applies an initialization signal to inputs 27 and 29, so that the signal appears simultaneously at these inputs, thus producing an output signal which charges the capacitors of elements 23 and 43 and, if required, discharges the capacitors in circuits 4 and 14.

We shall now consider various possible faults and show how the safety device can apply the brakes urgently not only when the train speed is excessive but also when the two channels (assemblies 1 and 2) provide discrepant information. In the latter case the vehicle has to be stopped, since clearly the safety device is not operating properly.

First possible fault.

After proper operation over one section, a signal is obtained at the output of monostable 3 but not at the output of monostable 13.

In this case no signal is obtained at the outputs of gate 26, since the signal at its input 29 is at the logic level "0" as no signal is applied to input 41 of gate 40. Thus, at the end of this section and at the beginning of the next section, output 24 of element 23 is at logic level "0" whereas output 44 of element 43 is at logic level "1".

If this fault continues in subsequent sections (i.e. a signal at the output of monostable 3 but no signal at the output of monostable 13), the outputs of gate 26 will remain at logic level "0" and the capacitor of element 23 cannot recharge. After a predetermined time (e.g. equal to two sections) or after a predetermined distance has been travelled, during which no signal has appeared at the outputs of gate 26, the emergency brake is applied. The time and/or length in question are determined by the processing circuit 60.

If a section during which the information provided by monostables 3 and 13 is contradictory is followed by sections in which the signals appearing at the outputs of monostables 3 and 13 are in agreement, i.e. indicate normal operation, the emergency brake is still applied, since the logic level "0" at output 24 of element 23, and therefore at output 22 of gate 20, maintains input 27 of gate 26 at the level "0" as before, thus likewise preventing a signal from appearing at the outputs of gate 26. In this case, incidentally, the output signal of monostable 13 discharges the capacitor of element 43 and brings its output 44 to the logic level "0".

This feature, according to which contradictory information supplied by the two channels results in emergency braking, is particularly advantageous since the circuits used for each channel need not necessarily be "fail-safe", since they are made fail-safe by checking that the information supplied by both channels is in agreement.

This first class of possible faults can also include the following incident: One of the two channels is affected by a periodic fault, i.e. the corresponding monostable delivers a signal in only one section in every two, whereas a signal appears at the output of the other monostable at each section. In this case the emergency brake is applied as before, since this fault corresponds to the first case contemplated hereinbefore. In practice, a cyclic fault of this kind may occur e.g. if a weld is deteriorated on one channel.

The same category of faults can also include the case where a cyclic fault occurs simultaneously in both channels (i.e. no signal at the output of circuits 3 and 13 during alternate sections). In this case, the emergency brake will not be applied. This is not a disadvantage in practice, since the probability of such a fault is practically zero.

Second possibility

Both channels become faulty simultaneously, so that monostables 3 and 13 fail to provide a signal for at least two successive sections.

In this case the emergency brake will be applied since no signal appears at the outputs of gate 26 during the predetermined time or over the predetermined distance.

Third possibility

It is assumed that at least one of the assemblies 1 or 2 is affected by a fault such that, during a section, the transitions in the output signals of assemblies 1 and 2 appear at times which differ by a duration t such that it does not satisfy the condition $\theta - \tau \leq t \leq \theta + \tau$.

In this case, the output signals of gates 20 and 40 do not appear simultaneously at inputs 27 and 29 of gate 26, so that no signal is obtained at the outputs of gate 26.

Even if operation returns to normal during the next sequence, the emergency brakes will still be applied since the capacitors of elements 23 and 43 cannot recharge (in other words, the logic signal delivered by elements 23 and 43 remains at "0").

The last-mentioned kind of fault occurs e.g. when there is a short-circuit such that the reference signal applied to the second input of the comparator in one assembly is practically zero; in this case, the transition from the "high" to the "low" level of the output signal of the assembly appears right at the beginning of the section.

Finally, to complete the description of the operation of the safety device shown in FIG. 1, AND gate 26 is a coincidence circuit which delivers a signal only if signals are simultaneously applied to its two inputs, whereas the combination of AND gates 20 and 40 and elements 23 and 43 is an "anti-coincidence and store" circuit carrying out a function which is the complement of the exclusive OR function. This function, however, is not between simultaneous signals but between signals separated by a section. It is known that an exclusive OR complement gate delivers a level "1" output signal when the input signals both have the same value (1 or 0); the output signal is at the logic level "0" in the opposite case, i.e., when the input signals have different values. In the present case, there are three input signals. The first input signal is the output signal of monostable 3, the second is the signal provided by monostable 13 and the third is the signal appearing at the output of gate 26. The output signal (i.e. from the imaginary exclusive OR complement gate) is made up of the output signal of elements 23 and 43; it has the logic level "1" if the levels of the output signals of elements 23 and 43 simultaneously have the value "1"; the output signal is at level "0" in other cases.

FIG. 3 shows in more detail some parts of the safety device which have been described with reference to FIG. 1. More specifically, FIG. 3 does not show assemblies 1 and 2, monostables 3 and 13 and circuits 60 and 61.

In FIG. 3, the "low" or "0" signal level corresponds to a negative potential, e.g. $-12$ V, whereas the "high" or "1" level corresponds to zero potential.

As shown in FIG. 3, circuit 4 comprises inter alia an NPN transistor 70 and a capacitor 71 whose plate 71a is connected to the collector of transistor 70. The collector of transistor 70 is connected to earth (zero potential) via a resistor 72 and the emitter of transistor 70 is connected to the negative ($-$) terminal of a d.c. supply (not shown). Capacitor 71 has a discharge circuit comprising an N channel type field-effect transistor 73 whose emitter constitutes the zero-resetting terminal 7 of circuit 4, the discharge circuit also comprising a diode 73a.

AND gate 20 comprises an oscillator circuit made up of an NPN transistor 75, an inductor 76 and capacitors 77. The emitter of transistor 75 is connected to earth and its base is connected to earth via a Zener diode 78. Input 21 of gate 20 is the base of transistor 75. The second input 22 of gate 20 is the second terminal of inductor 76, the first terminal of which is connected to the collector of transistor 75.

The store element 23 comprises a capacitor 80 having one plate connected to earth and the other plate connected to input 22.

Inductor 76 is coupled to an inductor winding 76a. The signal appearing at the outputs of inductor 76a constitutes the output signal of gate 20.

Like AND gate 20, AND gate 26 comprises an oscillator circuit made up of transistor 82, inductor 83 and capacitor 84. That terminal of inductor 83 which is not connected to the collector of transistor 82 constitutes the first input 27 of gate 26. The second input 29 of gate 26 is the base of transistor 82. As in the case of gate 20, a Zener diode 85 is provided between earth and the base of transistor 82.

Inductor 83 is coupled to three separate inductors 83a, 83b and 83c having terminals at which the output signals of gate 26 appear.

As shown in FIG. 3, the signal appearing at the terminals of inductor 76a is rectified by a diode and capacitor circuit 86. Similarly, the signal at the outputs of inductor 83a is rectified by a diode 87 so as to charge capacitor 80.

In the example, the initialization circuit 48 comprises a transformer 90 having two secondary windings 91 and 92. The signal appearing at the terminals of winding 91 is rectified by a diode and capacitor circuit 93 and applied to input 27; similarly, the signal at the terminals of winding 92 is rectified by a diode and capacitor circuit 94 and applied to input 29 of gate 26. Of course, an a.c. source (not shown) is provided for energizing the primary winding of the transformer 90.

In the example, circuit 14 is identical with circuit 4, circuit 40 is identical with circuit 20 and element 43, like element 23, substantially comprises a capacitor 80'.

The output of inductor 83b is connected to the emitter of transistor 73 (in the same way as to the emitter of the corresponding transistor in circuit 14) via a rectifying element 96.

With regard to the operation of the circuit shown in FIG. 3, the zero-potential signals transmitted to the base of transistor 70 saturate it. Under these conditions, capacitor 71 can charge. When the signal transmitted to the base of transistor 70 takes the value $-12$ V, transistor 70 becomes non-conductive, so that the second plate 71b (forming the output 5 of circuit 4) of capacitor 71 is brought to a positive potential owing to the charge accumulated by capacitor 71.

With regard to the operation of gate 20 (or gate 26), periodic output signals can be produced when positive potentials are present simultaneously at the base of the corresponding transistor and at that terminal of inductor 76 (or 83) which is not connected to the collector of the last-mentioned transistor.

Figure 4:
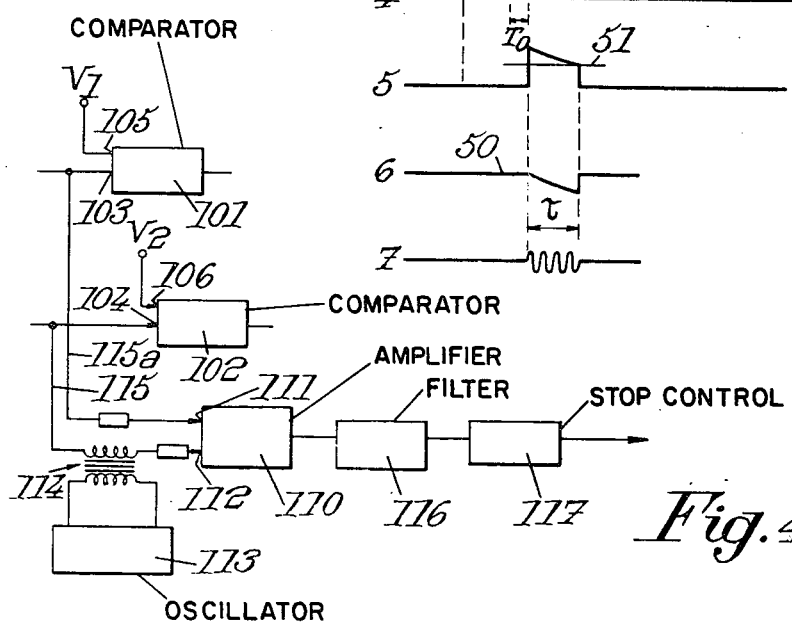
FIG. 4 shows another feature of the safety device according to the invention.

FIG. 4 illustrates another feature of the device, whereby the emergency brakes are triggered when the signals produced by assemblies 1 and 2 are not identical. In other words, the last-mentioned feature is applicable only to the case where assemblies 1 and 2 are adapted to produce identical signals at all times.

In the embodiment shown in FIG. 4, as in the previously-described example, each assembly comprises a comparator 101 (or 102). Each comparator has two inputs, the first of which (103 or 104 respectively) receives saw-tooth signals having a constant slope. The second inputs 105 and 106 of comparators 101 and 102 are supplied by reference-signal sources delivering voltages $V_1$ and $V_2$ respectively.

A saturable differential amplifier 110 has a first input 111 which, via a conductor 115a, receives the saw-tooth signal which is supplied to input 103 of comparator 101. The second input 112 of amplifier 110 receives a signal made up of the sum of the saw-tooth signal applied to input 104 of comparator 102 and an a.c. signal having a set frequency f and amplitude $\delta V$. Amplitude $\delta V$ is substantially less than voltages $V_1$ and $V_2$, and frequency f is appreciably greater than the frequency at which the saw-tooth signals appear. In an embodiment, the frequency f is 10 kHz. The periodic signal is produced by an oscillator 113 supplying the primary winding of a transformer 114, the secondary winding of which is connected in series with conductor 115 carrying the saw-tooth signal supplying input 104 of comparator 102.

The output of amplifier 110 is connected to the input of a band-pass filter 116. The filter pass-band includes the frequency f of the signal generated by oscillator 113.

The output of filter 116 is connected to the input of a rectifier circuit 117. The signal delivered by circuit 117 is used for permanently closing the solenoid valves controlling the emergency brakes.

During normal operation, the saw-tooth signals on conductors 115 and 115a have the same value at each instant. Under these conditions, amplifier 110 delivers only the signal supplied by oscillator 113. Accordingly, a signal is obtained at the output of filter 116. The signal is rectified by circuit 117, which supplies a permanent d.c. signal, preventing the emergency brakes from being triggered.

If, on the contrary, as the result of a fault, the saw-tooth signals have different values which may exceed the amplitude V, the difference signal will saturate the differential amplifier 110 and the output signal thereof will no longer contain the frequency f. In that case, no signal will be obtained at the output of circuit 117, thus triggering emergency braking.

The advantage of the feature described with reference to FIG. 4, is that any faults in the safety device can be rapidly detected, since the output signal of circuit 117 can be used for immediately triggering the emergency brake. By contrast, the signals produced by the device described with reference to FIGS. 1–3 cannot usually trigger the emergency brakes until after the train has travelled two sections of track, since a fault is detected only after travelling over a section.

The safety device described with reference to FIGS. 1–4 can be varied in many ways. More particularly, the number of channels in the device is not limited to two. The two channels need not be identical, as in the described example; this applies not only to the elements which have been shown but also to all the components helping to produce the signals supplying the safety device.

The difference having the duration $\theta$ between the output signals of assemblies 1 and 2 (FIG. 1) can be obtained not only by choosing different threshold values but also if the beginning of the count determining the time for travelling through a sequence is shifted by a given number of clock pulses in one channel. Alternatively, the difference can be produced by both methods indicated.

The safety device has numerous applications. It is applicable in general to any system or device operating in sequential manner. In addition to the previously-mentioned advantages, the safety device according to the invention is very simple and economic to construct.

I claim:

1. A safety device for a system or apparatus which operates in a sequence of stages, said safety device acting to terminate the operation of the system or apparatus when a parameter representing said operation exceeds a set threshold in a given direction during an operating stage, said device comprising:

first and second comparison means each for comparing said parameter with said threshold, each said comparison means having an output at which a comparison signal is delivered during each operating stage, said comparison signal having a first value when said parameter remains within said threshold and a second value when said parameter exceeds said threshold; and coincidence means comprising first and second inputs connected to said output of said first and second comparison means respectively, and an output at which said coincidence means delivers an output signal during each operating stage, said output signal having a first level when the comparison signals applied to said first and second inputs simultaneously have the same value and a second level otherwise; and means responsive to an output signal at said second level from said coincidence means to initiate termination of the operation of the system or apparatus; and locking means responsive to an absence of the comparison signals having the same value simultaneously during an operating stage to cause the output signal of said coincidence means to have the second level during subsequent operating stages.

2. A safety device as claimed in claim 1, wherein said locking means comprises, for each comparison means, a store element having an input and an output and an AND gate element having two inputs and an output, said coincidence means having a further output connected to the input of each said store element, the output of each said store element being connected to one input of the respective AND gate element, the other input of said AND gate element being connected to said output of the respective comparison means, the outputs of said two AND gate elements being connected to said first and second inputs of said coincidence means, each said store element delivering an output signal having a first value when a signal at the first level is applied to the input of the store element, the output signal of said store element changing from the first to a second value when a comparison signal having the first value is applied to the second input of the respective AND gate element.

3. A safety device as claimed in claim 2, wherein each said store element comprises a capacitor.

4. A safety device as claimed in claim 2, wherein said outputs of said coincidence means are galvanically isolated from one another.

5. A safety device for a system or apparatus which operates in a sequence of stages, said safety device acting to terminate the operation of the system or apparatus when a parameter representing said operation exceeds a set threshold in a given direction during an operating stage, said device comprising:

first and second comparison means, each for comparing said parameter with said threshold, each comprising a signal generator delivering at an output thereof a signal varying in a given manner in dependence upon said parameter, and a comparator having a first input connected to the output of said signal generator and a second input connected to receive a signal representing said threshold, said signal generators of said first and second comparison means producing signals having substantially identical values at each instant, and each said comparison means having an output at which a comparison signal is delivered during each operating stage, said comparison signal having a first value when said parameter remains within said threshold and a second value when said parameter exceeds said threshold; and a differential amplifier having a first input connected to the output of said signal generator of said first comparison means and a second input connected to an output of an adder means, said adder means being connected to add a signal from a reference generator producing a signal at a given frequency to a signal from said signal generator of said second comparison means, and an output at which said differential amplifier delivers an output signal during each operating stage, said output signal having a first level when the comparison signals applied to said first and second inputs simultaneously have the same value and a second level otherwise; and a band-pass filter connected to the output of said differential amplifier, the pass band of said filter including said given frequency; and emergency stop control means connected to the output of said filter and responsive to the output signal of said filter to initial emergency stopping when the output signal of said filter falls below a given value.

6. A safety device for a system or apparatus which operates in a sequence of stages, said safety device acting to terminate the operation of the system or apparatus when a parameter representing said operation exceeds a set threshold in a given direction during an operating stage, said device comprising:

first and second comparison means each simultaneously comparing said parameter with said threshold, each said comparison means having an output at which a comparison signal is delivered during each operating stage, said comparison signal having a first value when said parameter remains within said threshold and a second value when said parameter exceeds said threshold; and coincidence means comprising first and second inputs connected to said output of said first and second comparison means respectively, and an output at which said coincidence means delivers an output signal during each operating stage, said output signal having a first level when the comparison signals applied to said first and second inputs simultaneously have the same value and a second level otherwise; and means responsive to an output signal at said second level from said coincidence means to initiate termination of the operation of the system or apparatus, said first and second comparison means comprising respective first and second pulse generators each for generating during each operating stage a pulse having a first value when said parameter remains within said threshold and a second value when during the same stage said parameter exceeds said threshold, the leading edge of the pulse produced by said second pulse generator occurring a predetermined time after the leading edge of the pulse produced by said first pulse generator in a given stage during normal operation, said first comparison means also comprising delay means having an input connected to the output of said first pulse generator so that the trailing edges of the pulses produced at the outputs of said first and second comparison means during the same operating stage are substantially simultaneous during normal operation.

* * * * *